US012728868B2

(12) United States Patent
Weston et al.

(10) Patent No.: US 12,728,868 B2
(45) Date of Patent: Sep. 8, 2026

(54) SYSTEM AND METHOD FOR SELECTIVE VEHICLE DRIVING ASSISTANCE RELATIVE TO RUTS IN AN OFF-ROAD ENVIRONMENT

(71) Applicant: Ford Global Technologies, LLC, Dearborn, MI (US)

(72) Inventors: Keith Weston, Canton, MI (US); Anna Frances Hardig Hendrickson, Southfield, MI (US); Brendan Diamond, Grosse Pointe, MI (US); Stuart C. Salter, White Lake, MI (US); Kenneth Patrick Mchugh, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 170 days.

(21) Appl. No.: 18/487,521

(22) Filed: Oct. 16, 2023

(65) Prior Publication Data

US 2025/0121829 A1 Apr. 17, 2025

(51) Int. Cl.

*B60W 40/06* (2012.01)
*B60W 50/14* (2020.01)
*B60W 60/00* (2020.01)

(52) U.S. Cl.

CPC ............ *B60W 40/06* (2013.01); *B60W 50/14* (2013.01); *B60W 60/001* (2020.02); (Continued)

(58) Field of Classification Search

None

See application file for complete search history.

(56) References Cited

U.S. PATENT DOCUMENTS 10,063,836 B2 8/2018 Popham et al.
10,066,367 B1 * 9/2018 Wang ..................... E02F 9/262

(Continued)

FOREIGN PATENT DOCUMENTS

CN 108291814 A 7/2018
CN 108710730 A 10/2018

(Continued)

OTHER PUBLICATIONS

Ordonez, et al., Rut Detection and Following for Autonomous Ground Vehicles (2010), Florida A&M Department of Mechanical Engineering/Florida State University Department of Computer Science, Tallahassee, Florida.

(Continued)

*Primary Examiner* — Donald J Wallace
*Assistant Examiner* — Paysun Wu
(74) *Attorney, Agent, or Firm* — Burr & Forman; Lorne Forsythe

(57) ABSTRACT

A method of providing vehicle guidance for traversal of rutted terrain may include employing a sensor network to determine characteristics of ruts in the rutted terrain, and determining a proximity value between a portion of a body of the vehicle and the rutted terrain based on the determined characteristics. The method may further include, responsive to the proximity value being below a proximity threshold, defining a strategy for positioning the vehicle at a point of increased ground clearance relative to the ruts, and providing a guidance instruction to the vehicle according to the defined strategy.

16 Claims, 9 Drawing Sheets

(52) U.S. Cl.
CPC . *B60W 2420/403* (2013.01); *B60W 2420/408* (2024.01); *B60W 2556/65* (2020.02)

(56) References Cited

U.S. PATENT DOCUMENTS

2002/0023788 A1* 2/2002 Torrie .................. B62D 55/065 180/9.26
2005/0024492 A1 2/2005 Schaefer et al.
2012/0158243 A1* 6/2012 Pupin ..................... H04N 7/181 348/148
2017/0371336 A1* 12/2017 Mei ..................... B60W 30/095
2019/0135216 A1* 5/2019 Church .................. G08G 1/165
2019/0279512 A1 9/2019 Daniel
2021/0086695 A1* 3/2021 Mahnken ............... B62D 21/20
2021/0284172 A1 9/2021 Birkland et al.
2022/0032914 A1 2/2022 Mell et al.
2022/0073078 A1 3/2022 Kimura et al.
2022/0281456 A1* 9/2022 Giovanardi .......... G08G 1/0112
2023/0073055 A1 3/2023 Tsai et al.
2023/0137304 A1* 5/2023 Lei ..................... G01C 21/3461 701/80
2023/0174071 A1 6/2023 Ikeda
2023/0177840 A1 6/2023 Telpaz et al.
2024/0059119 A1* 2/2024 Ali ..................... B60G 17/0165

FOREIGN PATENT DOCUMENTS

EP 3560783 A1 10/2019
EP 3901725 A1 10/2021
JP 2005343456 A 12/2005
JP 2018103659 A 7/2018
JP 2018160008 A 10/2018
WO 2022113504 A1 6/2022

OTHER PUBLICATIONS

Gaszczak, Anna, Vision Based Environment Perception System for Next Generation Off-road ADAS (2017), a Thesis Submitted for the Degree of PhD in Engineering at the University of Warwick, Coventry, United Kingdom.

* cited by examiner

SYSTEM AND METHOD FOR SELECTIVE VEHICLE DRIVING ASSISTANCE RELATIVE TO RUTS IN AN OFF-ROAD ENVIRONMENT

TECHNICAL FIELD

Example embodiments generally relate to vehicle control algorithms and, more particularly, relate to a system and method for providing an off-road driver assistance feature for use with respect to ruts.

BACKGROUND

Navigating off-road terrain, or rugged trails, can often require coordinated application of both propulsive and braking torque, while simultaneously also steering the vehicle. This process can be even more challenging in the presence of ruts that may be worn into some off-road trails. Particularly when ruts are deep, the challenges are magnified and, in some cases, auxiliary devices such as sand ladders or recovery boards become necessary in order to traverse certain parts of the trails.

Thus, it may be desirable to develop a driver assistance feature that can be used to automatically provide assistance for the traversal of ruts and, if needed, also provide advice with respect to the placement and utilization of auxiliary devices to provide a more satisfying user experience.

BRIEF SUMMARY OF SOME EXAMPLES

In accordance with an example embodiment, a vehicle control system for managing vehicle operations in rutted terrain may be provided. The system may include a mode selector for enabling selection of an operating mode of the vehicle among a plurality of selectable operating modes, where at least one of the selectable operating modes includes an off-road driving assistance mode that controls propulsive torque application and/or steering when the off-road driving assistance mode is active. The system may further include a sensor network operably coupled to components of the vehicle to obtain characteristics of ruts, and a controller operably coupled to the sensor network to generate a guidance instruction based on the characteristics of the ruts in association with the off-road driving assistance mode responsive to receiving the characteristics of the ruts, determining a proximity value between a portion of a body of the vehicle and the rutted terrain based on the determined characteristics of the ruts, responsive to the proximity value being below a proximity threshold, defining a strategy for positioning the vehicle at a point of increased ground clearance relative to the ruts, and providing the guidance instruction to the vehicle according to the defined strategy.

In another example embodiment, a method of providing vehicle guidance for traversal of rutted terrain may be provided. The method may include employing a sensor network to determine characteristics of ruts in the rutted terrain, and determining a proximity value between a portion of a body of the vehicle and the rutted terrain based on the determined characteristics. The method may further include, responsive to the proximity value being below a proximity threshold, defining a strategy for positioning the vehicle at a point of increased ground clearance relative to the ruts, and providing a guidance instruction to the vehicle according to the defined strategy.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
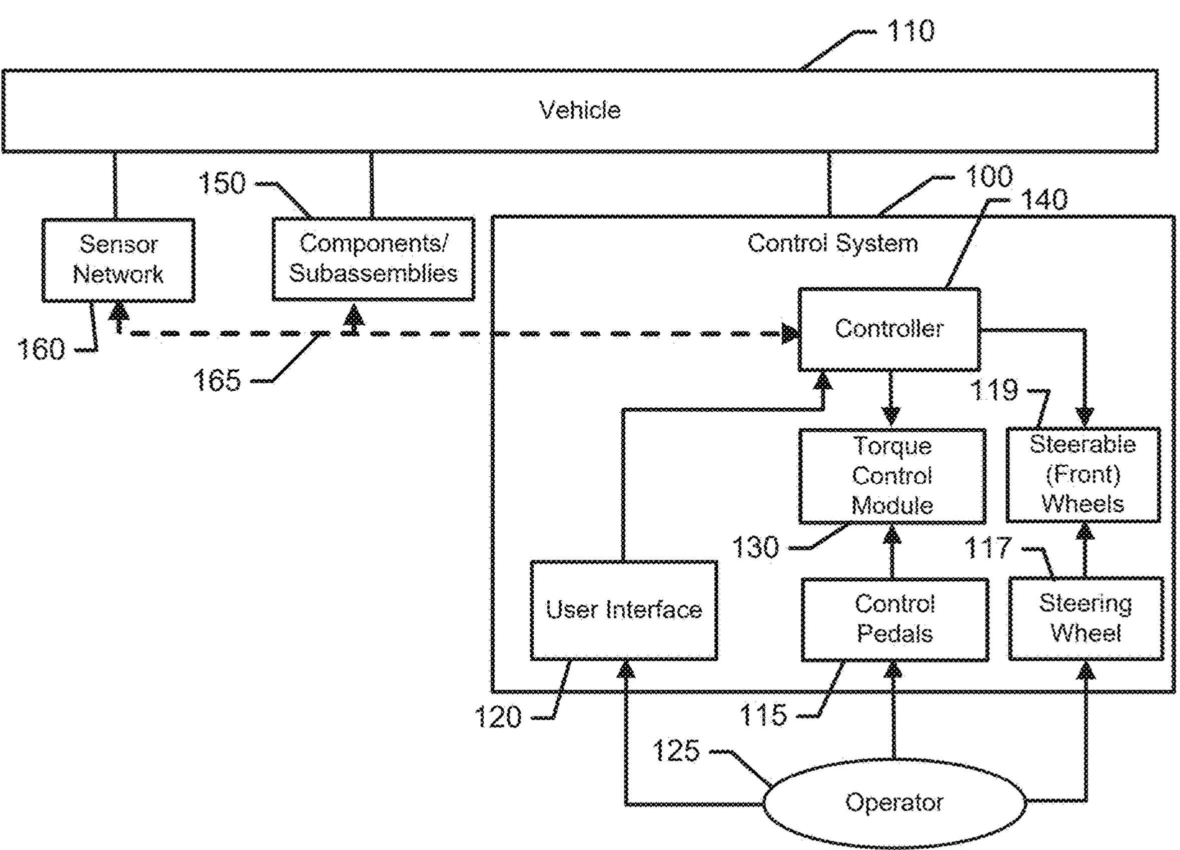
FIG. 1 illustrates a block diagram of a vehicle control system in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

As noted above, off-road driving may sometimes be aided by selection of a mode that may substitute two-pedal driving with a feature that can manage propulsion and braking at low speeds in off-road conditions (e.g., trail control). The trail control feature, or even other off-road driving modes may be desirable to enable a smooth forward vehicle motion to enable the driver to handle the steering aspect of the experience in certain challenging environments. However, particularly in areas where significant ruts have formed, the vehicle tends to be drawn into the ruts and the nature of the challenge can change by virtue of the limited steering authority available while in the ruts, and the fact that the underbody of the vehicle may contact the raised section of ground in between the ruts, which may result in the vehicle getting stuck if sufficient tractive contact with the wheels is lost, or otherwise reduce vehicle fuel economy or range if the vehicle struggles to regain traction.

Some example embodiments may therefore provide a control system that allows the driver to select an operating mode in which automated assistance is offered for off-road driving conditions relating to rutted terrain. In this regard, the sensor network of the vehicle may be used to evaluate the driving surface (e.g., below and/or ahead of the vehicle) to determine characteristics of the ruts, and develop a strategy (and in some cases automatically also execute the strategy) for traversing the rutted terrain. As such, some example embodiments may provide a more intelligent and capable system for vehicle control that can yield benefits in both customer confidence and vehicle capability. As a result, vehicle performance and driver satisfaction may also be enhanced.

FIG. 1 illustrates a block diagram of a control system 100 of an example embodiment. The components of the control system 100 may be incorporated into a vehicle 110 (e.g., via being operably coupled to a chassis of the vehicle 110, various components of the vehicle 110 and/or electronic control systems of the vehicle 110). Of note, although the components of FIG. 1 may be operably coupled to the vehicle 110, it should be appreciated that such connection may be either direct or indirect. Moreover, some of the components of the control system 100 may be connected to the vehicle 110 via intermediate connections to other components either of the chassis or of other electronic and/or mechanical systems or components.

The control system 100 may have a normal mode of operation that includes an input device in the form of control pedals 115 and a steering wheel 117 (or handwheel). The steering wheel 117 may be operably coupled to the steerable (e.g., front) wheels 119 of the vehicle via mechanical and/or electrical componentry to direct the steerable wheels 119. The control pedals 115 may include a brake pedal and a speed control pedal (e.g., throttle or gas pedal) pivotally mounted to the floor of the vehicle 110, and operable by an operator 125. The brake pedal may generally be used to provide inputs for control of braking torque, and the speed control pedal may be used to provide inputs for control of propulsive torque. However, the normal mode of operation may not be desirable for all cases. Moreover, selectable other modes of operation, including one or more off-road driver assistance modes may also exist. Accordingly, the control system 100 of some example embodiments may further include a user interface 120. The operator 125 may operate the user interface 120, which may include or define a mode selector to shift out of the normal mode of operation and into any of the other modes of operation. In one example embodiment, the other modes of operation that can be selected by the operator 125 via the user interface 120 may include an off-road driver assistance mode. Of note, although the term off-road driver assistance mode will generally be referred to herein as being the mode in which example embodiments are performed, the name of the mode in which example embodiments may be applied is not important, and certainly not limiting. Other terms like trail control mode, rut traversal mode, or any other descriptive terms for a mode in which the functionality described herein is applied, are also possible.

In the off-road driver assistance mode, the control pedals 115 may not be the primary source of input for controlling operation of the vehicle 110 with respect to torque control. The control pedals 115 may either be disabled or may be enabled to provide additive input relative to automatic control that may be initiated by a torque control module 130 of the control system 100 as described in greater detail below. In this regard, the control system 100 may automatically control vehicle speed to a target speed using positive and negative torque application. However, in some cases, the control pedals 115 may remain the primary means for providing positive and negative torque inputs, so the automated control option is just one option for how torque control may be provided to the vehicle 110 in the off-road driver assistance mode.

In some cases, the control system 100 may include the torque control module 130, which may be part of or otherwise operably coupled to a controller 140. The torque control module 130 may be configured to determine net torque as described herein based on inputs from any or all of the controller 140, the user interface 120, the control pedals 115 or other components of the vehicle 110. Thus, for example, the torque control module 130 may determine, based on a strategy selected by the operator 125 or by the controller 140, how to apply individual wheel torque modifications for propulsive and/or braking inputs that assist in maintaining intended directional progress through rutted terrain (with the intention being either that of the operator 125 or as expressed by an algorithm for automated control). In some cases, the controller 140 may be part of an electronic control system of the vehicle 110 that is configured to perform other tasks related or not related to propulsive and braking control or performance management. However, the controller 140 could be a dedicated or standalone controller in some cases.

In an example embodiment, the controller 140 may receive information that is used to determine vehicle status from various components or subassemblies 150 of the vehicle 110. Additionally or alternatively, various sensors that may be operably coupled to the components or subassemblies 150 may be included, and may provide input to the controller 140 that is used in determining vehicle status. Such sensors may be part of a sensor network 160 and sensors of the sensor network 160 may be operably coupled to the controller 140 (and/or the components or subassemblies 150) via a vehicle communication bus (e.g., a controller area network (CAN) bus) 165.

The components or subassemblies 150 may include, for example, a brake assembly, a propulsion system and/or a wheel assembly of the vehicle 110. The brake assembly may be configured to provide braking inputs to braking components of the vehicle 110 (e.g., friction brakes and electrical methods of braking such as regenerative braking) based on a braking torque determined by the controller 140 and/or torque control module 130. The propulsion system may include a gas engine, electric motor, or any other suitable propulsion device. The controller 140 and/or torque control module 130 may be configured to determine propulsive torque inputs for provision to the propulsion system to apply propulsive torque to the wheels of the wheel assembly of the vehicle 110. Moreover, one or more corresponding sensors of the sensor network 160 that may be operably coupled to the brake assembly and/or the wheel assembly may provide information relating to brake torque, brake torque rate, vehicle velocity, vehicle rate of change of speed, front/rear wheel speeds, vehicle pitch, etc. Other examples of the components or subassemblies 150 and/or corresponding sensors of the sensor network 160 may provide information relating to yaw, lateral G force, throttle position, selector button positions associated with chassis and/or vehicle control selections, etc.

Accordingly, for example, the controller 140 may be able to receive numerous different parameters, indications and other information that may be related to or indicative of different situations or conditions associated with vehicle status. The controller 140 may also receive information indicative of the intent of the operator 125 relative to control of various aspects of operation of the vehicle 110 and then be configured to use the information received in association with the execution of one or more control algorithms that may be used to provide instructions to the torque control module 130 in order to control application of net torque to the wheels of the wheel assembly of the vehicle 110 and/or control application of steering inputs to the steerable wheels 119.

In an example embodiment, the operator 125 may use the user interface 120 to select the off-road driver assistance mode. In some cases, the user interface 120 may also be used to define a target speed at which the vehicle 110 should operate for off-road driving under automated speed control while in the off-road driver assistance mode. However, the speed control aspect is optional and some embodiments may not employ speed control autonomously. In an example embodiment, however, the off-road driver assistance mode may include algorithms or control functions related to the handling of driving over rutted terrain, as described herein. In this regard, for example, individual wheel torque control may be provided by the algorithms or control functions to maintain the wheels moving both in terms of location and torque application in accordance with the strategy for rut traversal.

Where speed control is included, selection of the off-road driver assistance mode may correspondingly activate the torque control module 130 to provide the automated speed (and/or torque) control based on information provided by the components or subassemblies 150 and/or corresponding sensors of the sensor network 160 (including the target speed). The automated speed/torque control may be accomplished based on an error measured between the current speed and the target speed by applying propulsive and braking torque requests that aim to reach and maintain the target speed. However, example embodiments may further employ the controller 140 to evaluate characteristics of the ruts of the rutted terrain that may be provided by the sensor network 160 to define a strategy for traversing the rutted terrain that considers the characteristics measured or determined. In some cases, the characteristics may include tractive information such as information regarding the type of surface being traversed (e.g., sand, dirt, pavement, rock, gravel, etc.) and its condition (e.g., muddy, dry, frozen, soft, hard, loose, firm, etc.). However, the control system 100 (and the controller 140 more specifically) may generally use the characteristics of the ruts to define either autonomously executed instructions, or displayed recommendations to the operator 125 (via the user interface 120), for traversal of the ruts based on the characteristics. Operation of the control system 100 in connection with the definition of a strategy for traversing rutted terrain will be described in greater detail below in reference to FIG. 2.

When the torque control module 130 is active, and automated controls thereof have been selected, the automated control may, in some cases, depend on (or modify) the driveline state of the vehicle 110. In this regard, the driveline may include front and rear axles, drive components for the front and rear axles and/or the components that provide coupling therebetween. Thus, for example, the driveline may include electric motors, gears and/or clutch components that operably couple the front and rear axles (and/or their driving components) to execute front wheel, rear wheel, four wheel, or all-wheel drive conditions whether in an ICE or BEV context. Some modifications described herein may depend on the current driveline state, or may change the driveline state, as described in greater detail below.

In an example embodiment, the controller 140 may include or otherwise control a terrain evaluator 170, which may in some cases be a functional module (e.g., instantiated at the controller 140) that is programmed or otherwise configured to perform various tasks, evaluations and/or control functions associated with traversing rutted terrain. However, although the controller 140 may generally be the actor associated with the actions attributed to the terrain evaluator 170, the terrain evaluator 170 could be a separate component controlled by the controller 140 in some cases.

Figure 2:
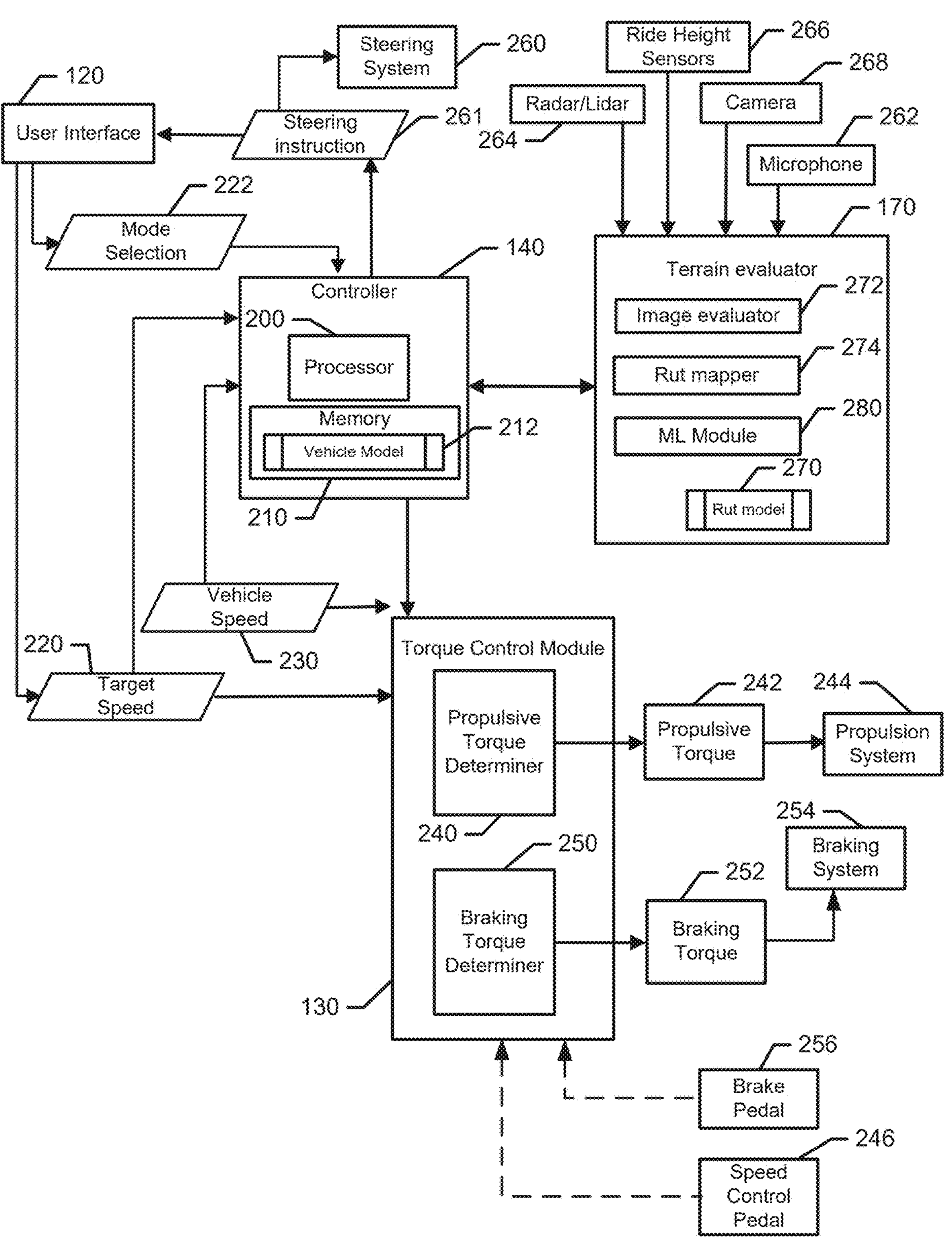
FIG. 2 illustrates a block diagram of some components of the vehicle control system of FIG. 1 in accordance with an example embodiment.

Referring now to FIG. 2, operation of the controller 140 and/or the terrain evaluator 170 with respect to controlling operations associated with traversing rutted terrain will be described. FIG. 2 illustrates a block diagram of various components of the control system 100 in greater detail. In this regard, for example, FIG. 2 illustrates example interactions between the controller 140 and the torque control module 130 relative to information received thereby (e.g., from the sensor network 160, from various ones of the components/subassemblies 150, and/or from the user interface 120). Processing circuitry (e.g., a processor 200 and non-transitory memory 210) at the controller 140 may process the information received by running one or more control algorithms. The control algorithms may include instructions that can be stored by the memory 210 for retrieval and execution by the processor 200. In some cases, the memory 210 may further store one or more models and/or tables (e.g., look up tables) and various calculations and/or applications may be executed using information in the models or tables and/or the information as described herein. In an example embodiment, the memory 210 may store a vehicle model 212, which may include a representation of the vehicle 110 that provides, among other information, ground clearance information indicative of the distance between level ground on which the vehicle 110 is located and various portions or components on the underside of the vehicle 110. In some cases, the vehicle 110 may include a skid plate or other underbody protection that defines a point of the vehicle 110 at which contact with a high point between ruts is most likely to occur. A distance from the skid plate to the plane on which the wheels operate over flat ground may define the ground clearance nominal value in some cases.

The vehicle model 212 may also include information modeling the response of the vehicle 110 to various suspension events including information indicating how the ground clearance changes due to vehicle loading or encountering obstacles at various speeds, pitches, or other specific conditions. Thus, for example, the ground clearance nominal value may be modified responsive to various suspension events, and the modifications may themselves be recorded or estimated by the vehicle model 212. Ground clearance nominal values or modified values may then be compared to characteristics of ruts that can be evaluated using the sensor network 160 in order to determine whether contact is likely (or has happened) between the skid plate (or another portion of the vehicle 110) and the high point between the ruts.

Figure 3:
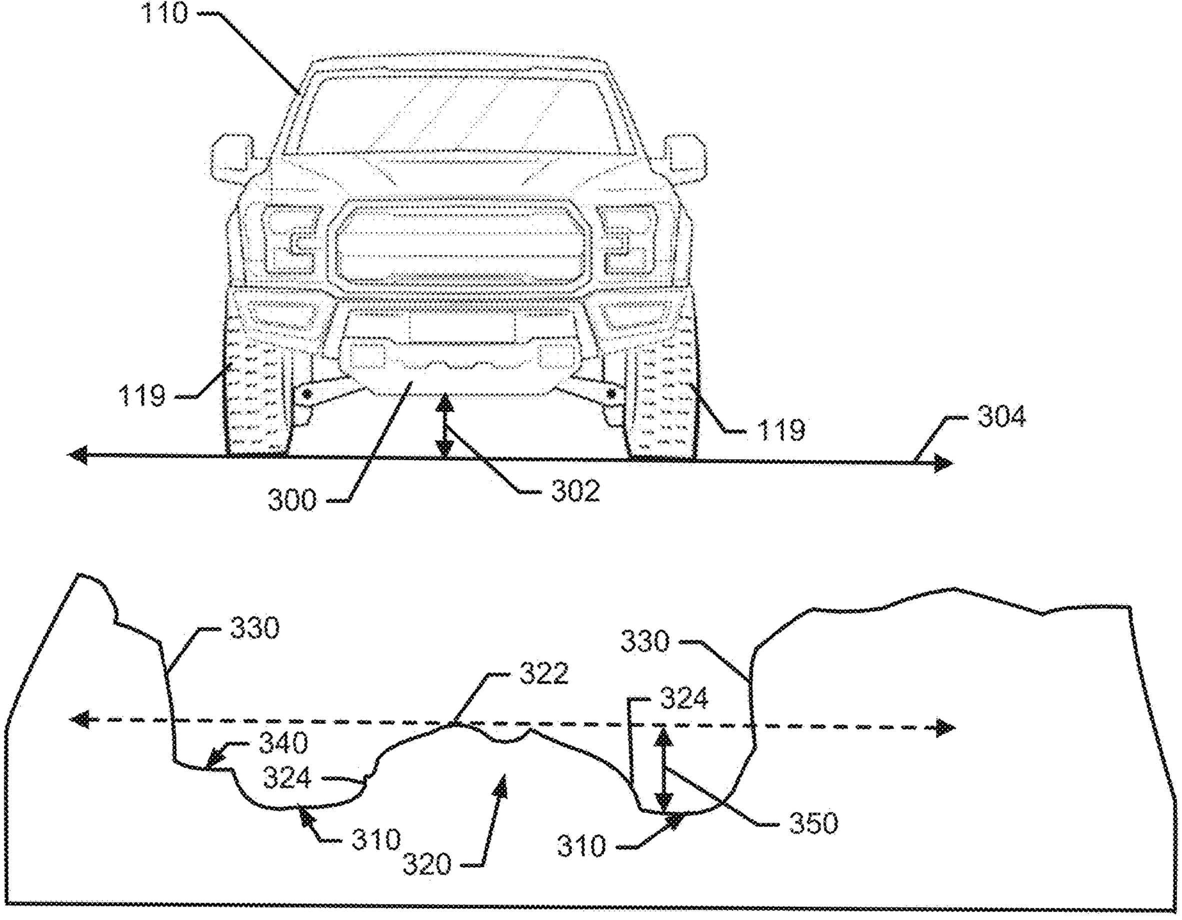
FIG. 3 illustrates a vehicle and a rut profile in accordance with an example embodiment.

Referring briefly to FIG. 3, some context information regarding the operation of the vehicle 110 relative to rutted terrain is shown. In this regard, the vehicle 110 is shown along with the steerable wheels 119 (which are the steerable wheels in this case) and a skid plate 300 located between the steerable wheels 119. A ground clearance value 302 is shown extending between the bottom of the skid plate 300 and a plane 304 on which the front wheels 119 would rest on level ground.

Meanwhile, the rutted terrain includes ruts 310 that define a raised section 320 therebetween, and the raised section 320 may include a high point 322. The raised section 320 may include inner walls 324 that define inner limits to the ruts 310 and form lateral boundaries of the raised section 320. The ruts 310 each include sidewalls 330, which are outer walls defining the lateral extent of the ruts 310 in this example. Although not always present, one of the ruts 310 of this example includes a shoulder portion 340. The shoulder portion 340 is located between the sidewalls 330 and the raised section 320, and is not as deep as the corresponding one of the ruts 310 to which the shoulder portion 340 is proximate (or adjacent).

Notably, FIG. 3 shows only one shoulder portion 340 and the shoulder portion 340 shown is formed proximate to a corresponding one of the sidewalls 330. However, it should be appreciated that another shoulder portion 340 may exist at any or all of the other sidewall 330 and each of the inner walls 324. When evaluating the ruts 310, a depth 350 of the ruts 310 may be measured from a bottom of the ruts 310 to the high point 322 as shown in FIG. 3. The depth 350 of the ruts 310 as measured at any given point may be compared to the ground clearance (e.g., nominal or modified) value to determine whether and to what degree a difference exists therebetween. If the depth 350 of the ruts 310 exceeds the ground clearance Returning to FIG. 2, the processor 200 may be configured to execute any control algorithms executed thereby in series or in parallel. However, in an example embodiment, the processor 200 may be configured to execute multiple control algorithms in parallel (e.g., simultaneously) and substantially in real time. The control algorithms may be configured to perform various calculations based on the information received/generated regarding characteristics of the ruts 310. The control algorithms may therefore execute various functions based on the information received, and generate outputs to drive the control of net torque applied at the wheels of the vehicle 110 and/or steering inputs to the steerable wheels 119. The torque control module 130 may itself be a control algorithm, or may include control algorithms in the form of functional modules (or sub-modules) configured to perform specific functions for which they are configured relating to control of the vehicle 110 in the manner described herein. Similarly, the terrain evaluator 170 may be a control algorithm, or may include a control algorithm in the form of a module or sub-module of the controller 140 configured to perform specific functions for which it is configured relating to determining characteristics of the ruts 310 in which the vehicle 110 is operating, and determining responses thereto, as described herein. Thus, for example, the controller 140 may actually function as the torque control module 130 and/or the terrain evaluator 170 responsive to executing the control algorithms. However, in other cases, the torque control module 130 and/or the terrain evaluator 170 may be a component or module of the controller 140, or an entirely separate component (e.g., each possibly also including its own corresponding processing circuitry).

In an example embodiment, the information upon which the control algorithms operate may include a target speed 220. In this regard, the target speed 220 may be selected by the operator 125 via the user interface 120 of FIG. 1. Moreover, the user interface 120 may include or otherwise act as a mode selector to enable a mode selection 222 to be made and communicated to the controller 140 to inform the controller 140 of the selected operating mode of the vehicle 110. The selected operating mode may be any of a plurality of operating modes (e.g., autonomous, normal, trail control (or off-road driver assistance), sport, parking assist, towing, etc.). The mode selection 222 may then cause the controller 140 to determine rut characteristics and responses thereto including providing steering input and/or informing the torque control module 130 with respect to specifically which models or algorithms to execute for the selected operating mode. The information upon which the control algorithms operate may also include vehicle speed 230. Vehicle speed 230 may be provided from a speedometer of the vehicle 110, from global positioning system (GPS) information, or any other suitable source including detectors capable of measuring wheel speed for each individual one of the wheels of the vehicle 110.

In an example embodiment, the torque control module 130 may be configured to include a propulsive torque determiner 240. In general, the propulsive torque determiner 240 may be configured to receive information in order to determine a propulsive torque 242 to be applied to a propulsion system 244 of the vehicle 110 (e.g., a gasoline engine, electric motor, and/or the like). In other words, propulsive torque 242 may be considered to be representative of a propulsive torque request, or a request for a corresponding determined amount of propulsive torque. When in the normal mode of operation, the information used to determine propulsive torque 242 may include a speed control input provided by a speed control pedal 246 (e.g., a throttle or gas pedal). When in the off-road driver assistance mode, the information used to determine the propulsive torque 242 may include target speed 220 and vehicle speed 230.

In an example embodiment, the torque control module 130 may also be configured to include a braking torque determiner 250. In general, the braking torque determiner 250 may be configured to receive information (e.g., including the target speed 220 and the vehicle speed 230) in order to determine a braking torque 252 to be applied to a braking system 254 of the vehicle 110. In other words, the braking torque 252 may be considered to be representative of a braking torque request, or a request for a corresponding determined amount of braking torque. When in the normal mode of operation, the information used to determine braking torque 252 may include a braking input provided by a brake pedal 256. When in the off-road driver assistance mode, the information used to determine the braking torque 252 may include target speed 220 and vehicle speed 230. However, even in the off-road driver assistance mode, if the operator inserts a braking input via the brake pedal 256, such input may also be considered with respect to determining the braking torque 252.

In an example embodiment, the controller 140 (and/or the torque control module 130) may be configured to determine an error or difference value based on comparing the vehicle speed 230 to the target speed 220 (e.g., in the off-road driver assistance mode). The controller 140 (and/or the torque control module 130) may control the application of the propulsive torque 242 to the propulsion system 244 and the braking torque 252 to the braking system 254 based on the error signal. Similar error signal control paradigms may be used to define a target steering angle relative to a current steering angle to obtain a desired steering output to control the direction of the vehicle 110 if automated control is being employed, or provide a visual output to the operator 125 via the user interface 120 to indicate a direction to turn the steering wheel 117. Accordingly, the controller 140 (and/or the torque control module 130) may be configured as a PID (proportional-integral-derivative) controller that is further configured to determine steering and/or torque control inputs for operation of the vehicle 110. The torque control module 130 (and/or controller 140) that may modify the control algorithm executed by the torque control module 130 relative to the normal calculations that are made for corresponding propulsive torque 242 or braking torque 252 calculations.

Accordingly, for example, the propulsive torque determiner 240 and/or the braking torque determiner 250 may be configured to determine the propulsive torque 242 and/or the braking torque 252, respectively, via error calculations noted above. Additionally or alternatively, a propulsive torque map or a braking torque map may be constructed and used (either by the torque control module 130 or the terrain evaluator 170) to determine how to limit or modify the torque requests otherwise normally determined by the torque control module 130 based on the terrain on which the vehicle 110 is operating. The torque control module 130 may therefore maintain speed control such that the vehicle speed 230 is maintained at or near the target speed 220 so that the operator 125 may focus on steering inputs to a steering system 260. However, in some cases, the controller 140 may also use information provided by the terrain evaluator 170 to generate a steering instruction 261, which may either be provided directly to the steering system 260 to direct steering of the steerable wheels 119, or to provide the steering instruction 261 to the user interface 120 in the form of a suggestion.

When provided to the user interface 120, the steering instruction 261 may suggest a direction (and sometimes also a magnitude) the operator 125 should turn to execute the strategy for traversing the ruts 310 that the controller 140 has determined based on the characteristics of the ruts 310 as determined by the sensor network 160. The user interface 120 may include an in-cabin display such as a heads up display, an augmented reality display, a console display or other indications provided at any portion of the dash, steering wheel 117 or other locations visible to the operator 125. However, the steering instruction 261 may be more complex in some cases to the extent that, for example, a view similar to those of FIGS. 4-6 may be provided to illustrate an avatar of the vehicle 110 located within the determined depth and dimension characteristics of the ruts 310.

In an example embodiment, the characteristics of the ruts 310 may be determined by the terrain evaluator 170 based on information determined, obtained or received from various sensors of the sensor network 160. In an example embodiment, the information may be provided by any or all of a microphone 262, a radar or lidar device 264, ride height sensors 266 and a camera 268, among other potential sensor options. The inputs to the terrain evaluator 170 provided by these sensors may be used to use sound, video, RF or other time of flight based scanning, or any other useful tools to form the basis for defining profile information descriptive of the ruts 310. In this regard, the profile information may include a measurement of a depth and dimensions of the ruts 310. Thus, in some cases, the profile information may define a model (e.g., a cross section view) of the ruts 310 (e.g., a rut model 270) that includes measurement and classification of the various elements shown in FIG. 3 made based on scanning the ruts 310 using the sensor network 160. Moreover, since the sensors of the sensor network 160 may be enabled to look not only below the vehicle 110, but also ahead of the vehicle 110 to as far as about 100 m in front of the vehicle 110, the profile information (of the rut model 270) may include a sequential series of cross section views or characterizations of the ruts 310. For example, at various intervals extending linearly along a path of the vehicle 110 that may be measured in inches, feet, meters, or other convenient segments, characterizations of the measurements and dimensions of the ruts 310 may be recorded and/or modeled for consideration relative to defining a strategy for traversing the ruts 310. The profile information may therefore include a series of lateral measurements across the ruts 310 that correspond to each linear segment extending along the path of the vehicle 110 so that the strategy for traversing the ruts 310 may consider not only the immediately present situation, but also the path ahead.

Figure 4:
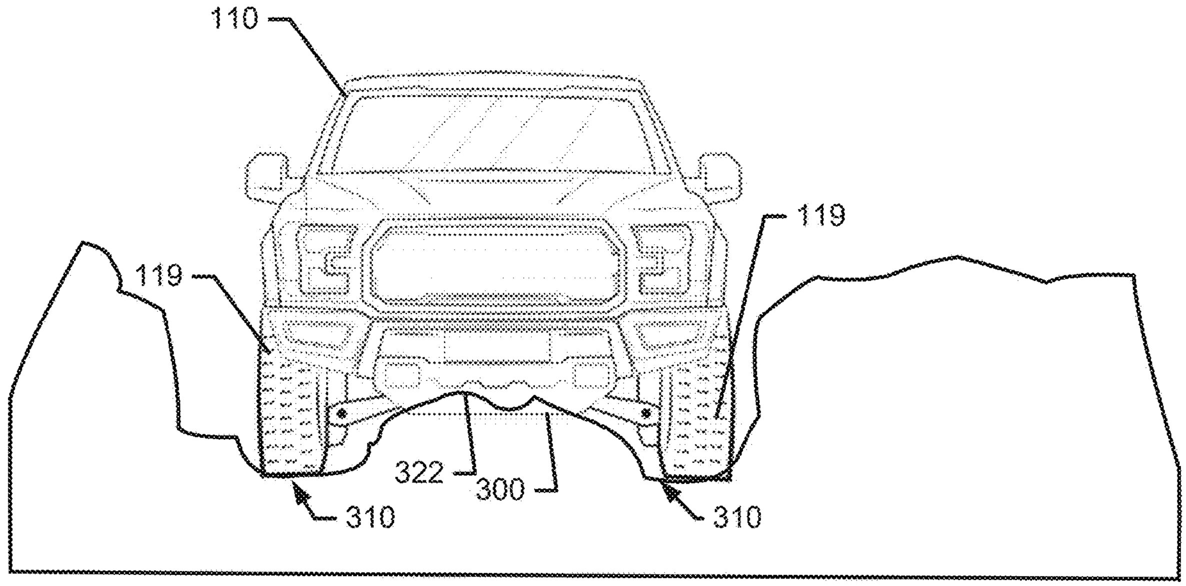
FIG. 4 illustrates the vehicle of FIG. 3 driving centered within the ruts in accordance with an example embodiment.

The microphone 262 may be used to analyze sound (or noise) that may indicate when the skid plate 300 encounters the high point 322 of the raised section 320 (as shown in FIG. 4). Thus, for example, the microphone 262 may be used to characterize ground contact noises and correlate the noises with vehicle reactions (e.g., via the vehicle model 212) in terms of suspension events that may be expected to follow. The ride height sensors 266 may be used to confirm ground contact has occurred, determine a proximity to initiation of such contact, or confirm that such proximity is maintained above a threshold. The ride height sensors 266 may be useful, for example, to determine when the vehicle 110 is going into a droop condition. Knowing that the vehicle 110 is going into a droop condition can indicate that the vehicle 110 is heading toward (if unchecked) a full droop condition where the wheels are no longer in contact with the bottom of the ruts 310 (which could lead to the vehicle 110 being stuck). Thus, by knowing that the vehicle 110 is starting to droop, the controller 140 may be enabled to alert the operator 125 to take action to increase the clearance and maintain distance between the skid plate 300 (or other vehicle portions) and the high point 322 (or other parts of the ruts 310).

Other means may also be employed for determining contact with the ground. For example, vertical motion (and rates of change thereof) may be measured to determine situations where vertical motion rates does not match with expected values consistent with shock absorbers arresting the motion. Similarly, if rates of change in motion do not correspond to wheel end load estimations, ground contact may explain the situation. Relative wheel end force or load versus expected wheel end force or load for a given vertical suspension position or wheel end position may also be considered in some cases. Generally, vertical rates of change in motion being greater than certain selected threshold values where suspension is not in full jounce as determined by the ride height sensors 266 or other sensors may indicate ground contact.

The radar or lidar device 264 may serve as a substitutes for (or additions to) the ride height sensors 266 for determining droop conditions or other ride height information. However, the radar or lidar device 264 may also scan the ruts 310 to perform the depth and dimension analysis mentioned above directly. The camera 268 may be one of potentially multiple cameras that may be used in connection with performing depth and dimension analysis. Thus, for example, the camera 268 may obtain direct image data of the ruts 310 proximate to one or more of the wheels of the vehicle 110 and the skid plate 300, as well as far out in front of the vehicle 110 (e.g., about 100 m ahead) including parallel paths or areas that are within a scope of visibility of the camera 268 (or cameras). In some cases, the terrain evaluator 170 may include an image evaluator 272 that evaluates inputs from the camera 268. The camera 268 may therefore provide the image data to the image evaluator 272, and the image evaluator 272 may determine the characteristics of the ruts 310 from the image data. The terrain evaluator 170 may also or alternatively include a rut mapper 274 that maps the ruts to define the rut model 270 or otherwise determine the depth and dimensions or other profile information (e.g., a rut profile) about the ruts 310 based on all of the inputs provided thereto. Beyond simply obtaining image data, however, the camera 268 may also be used in determining distance to the ground. The camera 268 may be an underbody camera, a rear camera, side camera, B-pillar camera, or any other type of vehicle camera that may gather image data or other measurement information.

After the profile information is determined regarding the ruts 310, the characteristics of the ruts 310 (e.g., depth and dimensions thereof) may be known. The depth may be measured from the bottom of the ruts 310 to the high point 322. Dimensions may be measured from sidewall 330 to sidewall 330, sidewall to shoulder portion 340, sidewall 330 to inner wall 324 for a given rut, inner wall 324 to inner wall 324, width of the shoulder portion 340, height of the shoulder portion 340, for each of many respective distances from the front of the vehicle 110. Other dimensions may also be measured. The measured dimensions may then be used by the controller 140 to determine a likelihood of contact with the high point 322. More generally, the measured depth and dimensions (e.g., as examples of the characteristics of the ruts 310) may used by the controller 140 to determine a proximity value between a portion of a body of the vehicle (e.g., the skid plate 300) and the rutted terrain (e.g., the high point 322) based on the determined characteristics of the ruts. Thus, for example, determining the proximity value may include comparing a known minimum clearance value for the body portion of the vehicle to the depth and dimensions of the ruts.

When the proximity value determined is below a threshold (which may define a minimum clearance/buffer, or may even be zero), either presently or at some point in the future if it is assumed that the vehicle 110 drives with wheels (e.g., steerable wheels 119) in the bottom of the ruts 310, then either autonomous action to prevent the proximity value from being below the threshold may be taken (by the controller 140 providing torque and/or steering inputs to control vehicle movement), or the operator 125 may be provided with information or guidance regarding how to increase the proximity value or maintain the proximity value above the threshold. The guidance or autonomous control may be issued as the result of or in the form of a control algorithm that defines a strategy for positioning the vehicle 110 in the ruts 310 in such a way as to maintain the proximity value above the threshold. Thus, for example, the strategy may include biasing vehicle wheel positions relative to the ruts 310 based on the depth and dimensional measurements of the ruts 310. In other words, a pathway may be defined through the ruts 310 by comparing the rut model 270 and the vehicle model 212 along the future route of the vehicle 110 within the ruts 310 that manages the proximity value with steering and/or torque inputs autonomously provided or suggested to the operator 125. The pathway may therefore be considered a "best position" for the wheels relative to the ruts 310.

Figure 5:
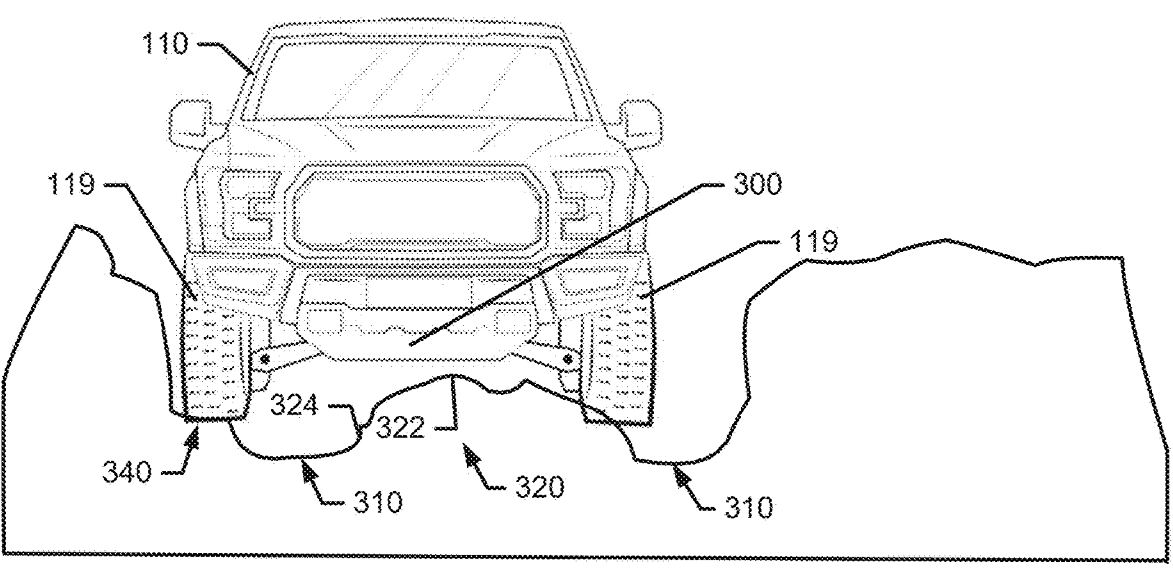
FIG. 5 illustrates the vehicle driving on a shoulder portion of the ruts in accordance with an example embodiment.
Figure 6:
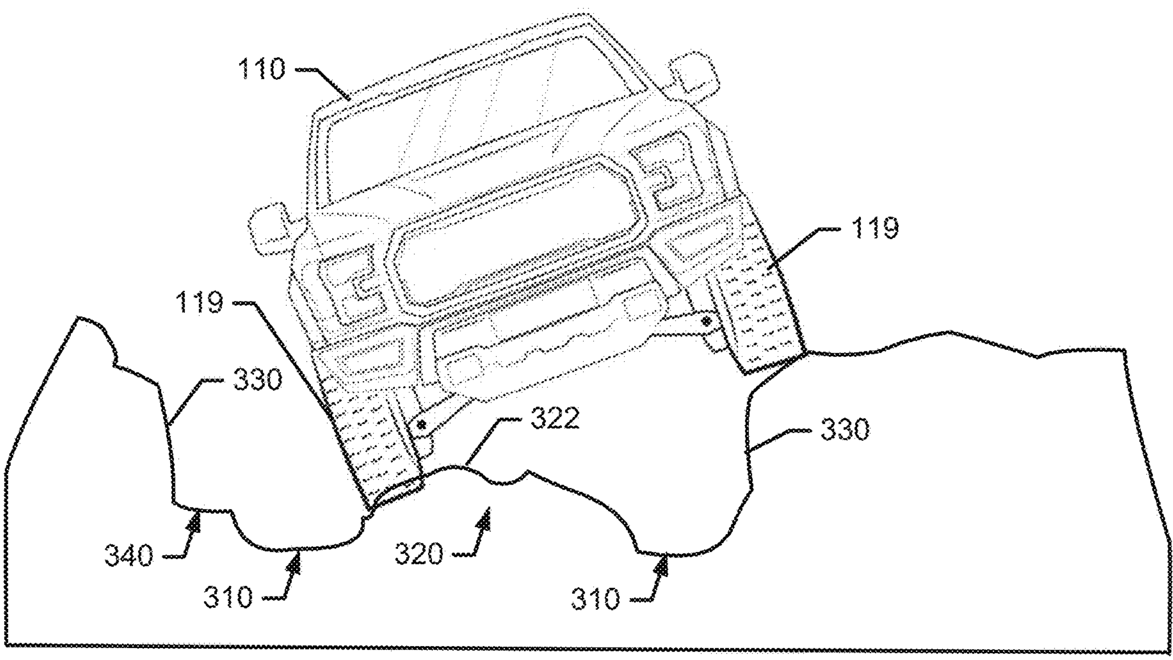
FIG. 6 illustrates the vehicle driving on a sidewall and raised section of the ruts in accordance with an example embodiment.

FIG. 5 illustrates an example where the strategy determined either autonomously guides the vehicle 110 such that the steerable wheels 119 are placed with one on the shoulder portion 340, and the other climbing onto the inner wall 324 of the rut opposite the one with the shoulder portion 340 adjacent thereto, or provides a suggestion regarding the same to the operator 125. Thus, one of the wheels is on the shoulder portion 340 and the other climbs onto the raised section 320. FIG. 6 illustrates an example where the strategy determined either autonomously guides the vehicle 110 such that the steerable wheels 119 are placed with one climbing onto the inner wall 324 of the rut 310 and the other climbing the sidewall 330 of the opposite rut 310. In both examples, the proximity value may be maintained above the threshold. However, as is apparent when comparing FIGS. 5 and 6, there are different degrees of lateral tilt of the vehicle 110, which the vehicle model 212 may consider when defining a preferred strategy.

In this regard, the controller 140 may consider the examples of FIGS. 4, 5 and 6 to be alternative potential paths for the vehicle 110. The vehicle model 212 may enable a physics based estimation of the expected reaction of the vehicle 110 to encountering each potential path to be considered relative to choosing the preferred path, and therefore also the preferred strategy. The physics based estimation may include expected changes in ride height for how the suspension of the vehicle 110 will articulate through kinematic suspension travel. Thus, the strategy decided upon may include continuing to drive with the steerable wheels 119 in the bottom or trough portion of the ruts 310 (e.g., if doing so will not cause the proximity value to drop below the threshold). Alternatively, the strategy decided upon may include driving to one side or the other of the ruts 310 where the vehicle 110 is partially skewed from the desired trail (or from the bottom or trough portion of the ruts 310) to minimize contact or the likelihood of contact between a portion of the vehicle body and the ground. Steering changes and/or torque changes may be prescribed autonomously or suggestively when driving on the side of the ruts 310 is the selected strategy.

As noted above, the sensor network 160 may be used to look ahead along the trail in which the ruts 310 are formed. The characteristics of the ruts 310 may be expected to change dynamically along the pathway ahead. Thus, the controller 140 may correlate the depth and dimension measurements made to respective future positions and times at which such positions are likely to be encountered (e.g., based on current speed). Knowing vehicle location relative to these positions may then be used to determine strategy and when to input various directions for changing steering or torque so that the vehicle 110 can successfully traverse all of the dynamic changes in characteristics of the ruts 310 as they are encountered and approached. The controller 140 will effectively bias the vehicle 110 (e.g., via torque vectoring and steering assistance) toward a preferred path that is chosen based on considering multiple path options and the proximity values associated with each. However, the controller 140 may also consider the surface itself, objects near or in the ruts 310 (e.g., branches, trees, rocks or other obstacles), or other factors to determine the path that maintains the largest proximity value or otherwise is determined to be more ideal or optimal for traversal. In some cases, where terrain changes quickly, a moving average for terrain telemetry may be used to blend the variations in terrain and make predictions or define reactions that work best considering the moving average. In some cases, for example, if the ruts 310 are expected to impede vehicle motion over a given percentage of one path (e.g., 25%), the strategy may be changed to an alternative path (e.g., on the shoulder portion 340) until the moving average height of the rut 310 indicates sufficient ground clearance can be achieved.

In an example embodiment, the controller 140 may also define various reactions to either ground contact being detected or other responses to the strategy to traversing the rutted terrain. In this regard, for example, any information learned by the controller 140 may be stored (e.g., in the memory 210) for future consideration so that information obtained over time may be analyzed and learned from. Moreover, in some cases, the terrain evaluator 170 (or controller 140) may include or otherwise be operably coupled to a machine-learning module 280. The machine-learning module 280 may employ one or more models or tables that can be modified over time using machine learning. The machine-learning module 280 may be convolutional neural network (or other neural network) or a regression based learning algorithm. Training data for the machine-learning module 280 may include stored (or shared) data corresponding to particular geographic locations. Thus, learning specific to location may be possible to better the strategy for traversal that is selected based on past efforts by either similar or different vehicles such that the machine-learning module 280 may employ models that are specific to the vehicle types from which data is received. In some cases, one model or table may be defined for and/or apply to each respective different type of vehicle and/or location. The models or tables may further include or consider factors determinable from sensors of the sensor network 160 including such information as tire pressure, tire width, ambient temperature, weight, weight distribution, weather conditions, age of training data, etc.

In an example embodiment, the strategy defined may not only include speed, torque, and steering inputs, but may further include adjustments to suspension components. In this regard, for example, increased position sensitive wheel end control may be employed to increase damping with position sensitive shock absorbers that can apply maximum damping at end of travel or full jounce, and the damping adjustments may be made based on the vehicle model 212. Meanwhile, specifically with respect to speed adjustments, the vehicle model 212 may enable determinations to be made regarding the effects of speed on clearance capability. Thus, for example, if a reduced speed may increase ground clearance, the strategy selected may include automated or recommended speed reductions. In some cases, speed reductions may be incrementally implemented responsive to observation of reduced proximity or multiple contact events within a period of time. Speed increases may be implemented back to the target speed 220 after such reductions when no contact events have occurred for at least a given period of time. The magnitude of vehicle speed 230 may dictate the magnitude of the speed changes inserted (e.g., higher speeds may involve higher speed change steps and lower speeds may involve smaller speed change steps).

In some embodiments, geo-fenced areas (or other defined areas) may be partially or fully characterized in terms of the rut characteristics of ruts in the respective areas, and/or in terms of vehicle reactions to ground contact or strategies in general. In other words, the controller 140 or terrain evaluator 170 may be further configured for employing machine learning to build a database of rut characteristics, suspension responses, and traversal strategies in a defined area. To facilitate building training data databases, and more accurate learning or updated learning by the machine-learning module 280, information may also be shared with other vehicles either via vehicle-to-vehicle (V2V) communication, vehicle to everything (V2X) communication, or via uploading to a cloud or other central server resource that may share such information with other vehicles. By this means, problem areas may be identified and either steered clear of altogether or at least attempted to be traversed with increased knowledge of expected challenges, and also with rut traversal strategies that are tailored for successful traversal.

Figure 7:
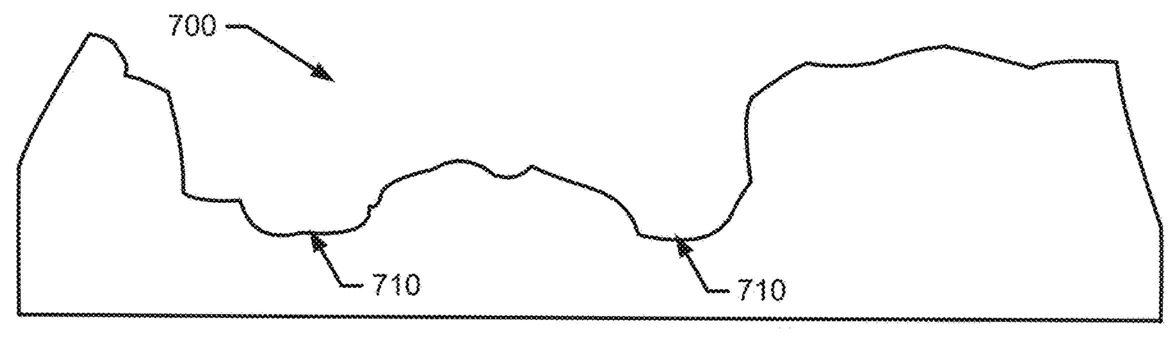
FIG. 7 illustrates a rut profile of a moderately difficult rated trail in accordance with an example embodiment.
Figure 8:
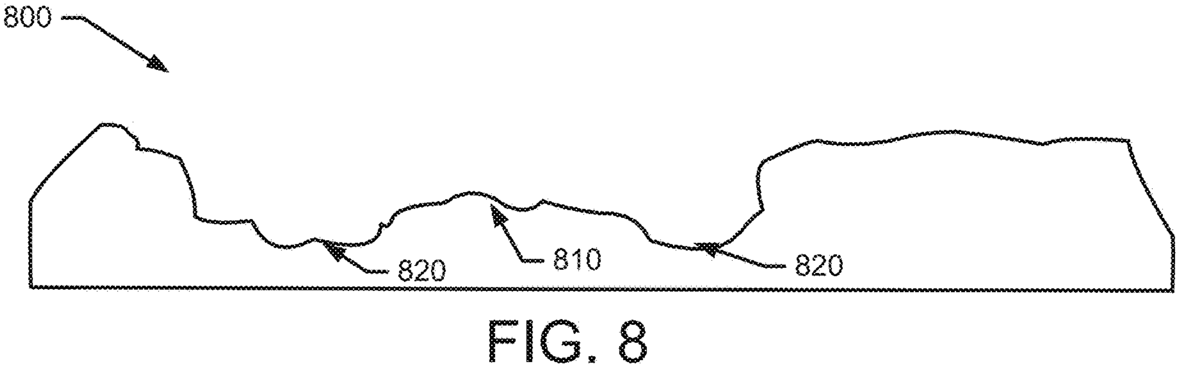
FIG. 8 illustrates a rut profile of an easy rated trail in accordance with an example embodiment.

In an example embodiment, the controller 140 may be further configured for providing a trail rating for multiple different trail options for a driver of the vehicle to evaluate. In this regard, FIG. 7 illustrates a first trail 700, which may be considered challenging since it includes relatively deep ruts 710 that may make it difficult to maintain the proximity value without implementing some strategic considerations. Meanwhile, FIG. 8 illustrates a second trail 800, which may be considered easy, since the raised section 810 may not be sufficient at any point to initiate contact with the skid plate 300 of the vehicle 110 when driving centered within the ruts 820. Finally, FIG. 9 illustrates a third trail 900, which may be impossible to traverse due to the height of the raised section 910 between ruts 920.

Figure 9:
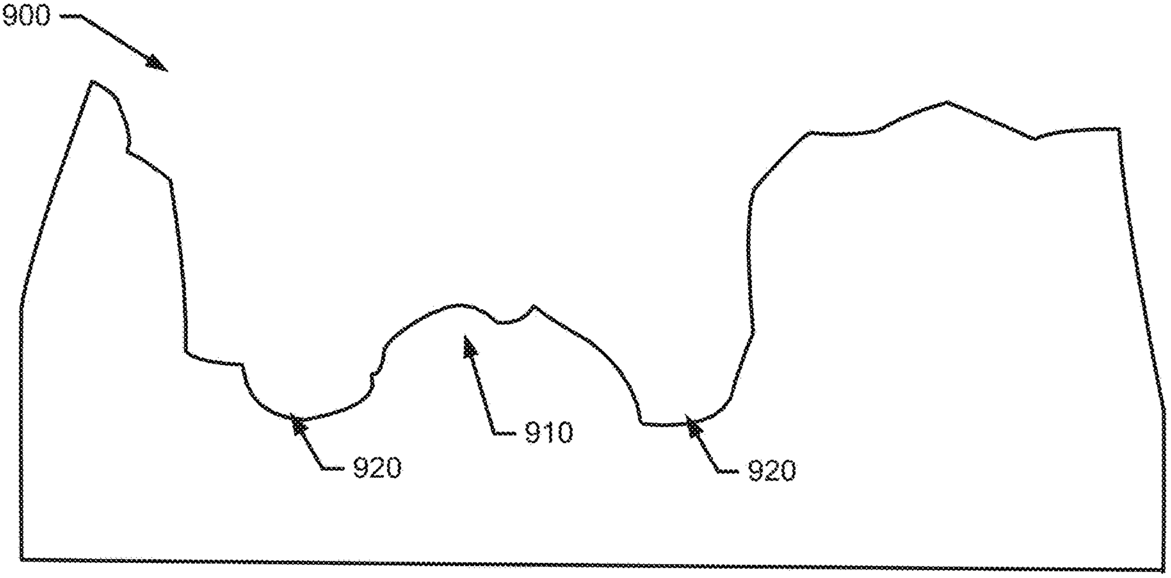
FIG. 9 illustrates a rut profile of an impossibly difficult rated trail in accordance with an example embodiment.

In situations where the first, second and third trails 700, 800 and 900 are all known to be in an area to which the vehicle 110 is proximate (or even simultaneously visible to the sensor network 160 in some cases), the controller 140 may generate a display of the trail rating (e.g., easy, hard, expert, impossible, etc.) with or without a profile image of the trail such as those shown in FIGS. 7-9. The operator 125 may use the user interface 120 to select a trail and receive guidance (autonomously or via recommendations) with respect to traversing the corresponding trail selected. As noted above, the strategy selected may be enhanced by machine learning associated with prior traversals by the same or different vehicles. Moreover, in some cases, if the operator 125 has used the mode selection 222 to indicate a desire or preference for a particular type of trail (e.g., easy), automated steering and speed control may be provided to maneuver the vehicle 110 to the trail that matches the preference inserted via mode selection 222, and traversal may be automatically accomplished (or assisted) via the controller 140. Thus, in this example, the vehicle 110 may be autonomously guided to and through the second trail 800.

If the third trail 900 is for some reason selected, or if the operator 125 should ever find that the vehicle 110 appears to be in a situation where further progress is not possible, the controller 140 may further be configured to provide an indication that auxiliary devices will be needed to complete traversal (or get unstuck). In this regard, for example, recovery boards, sand ladders or other auxiliary devices that may assist in traversing very deep ruts may be implemented under normal circumstances. However, the operator 125 may rely entirely on experience or trial and error with respect to the use and location of the same. Example embodiments may provide the display to indicate to the operator 125 which auxiliary device to use and how to place the auxiliary device relative to the ruts to allow the vehicle 110 to steer out of the ruts or otherwise traverse a challenging section using the auxiliary device. In some cases, the operator may be instructed to back up a distance to reach a better location for placement of the auxiliary device if the current location is poor, or a better location is known to have been passed.

Figure 10:
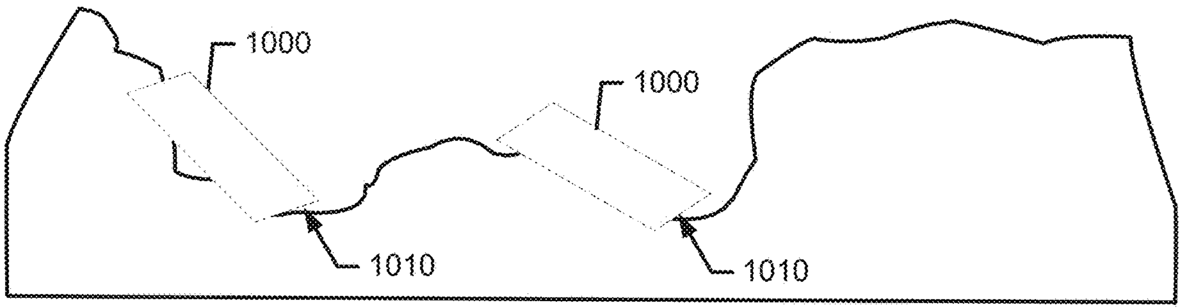
FIG. 10 illustrates a rut profile with recommendations for placement of auxiliary devices in accordance with an example embodiment.

FIG. 10 illustrates an example display screen in which placement of an auxiliary device 1000 (e.g., a sand ladder or recovery board) is shown relative to ruts 1010. In particular, the placement directed in this example would facilitate climbing entirely out of the ruts 1010.

Figure 11:
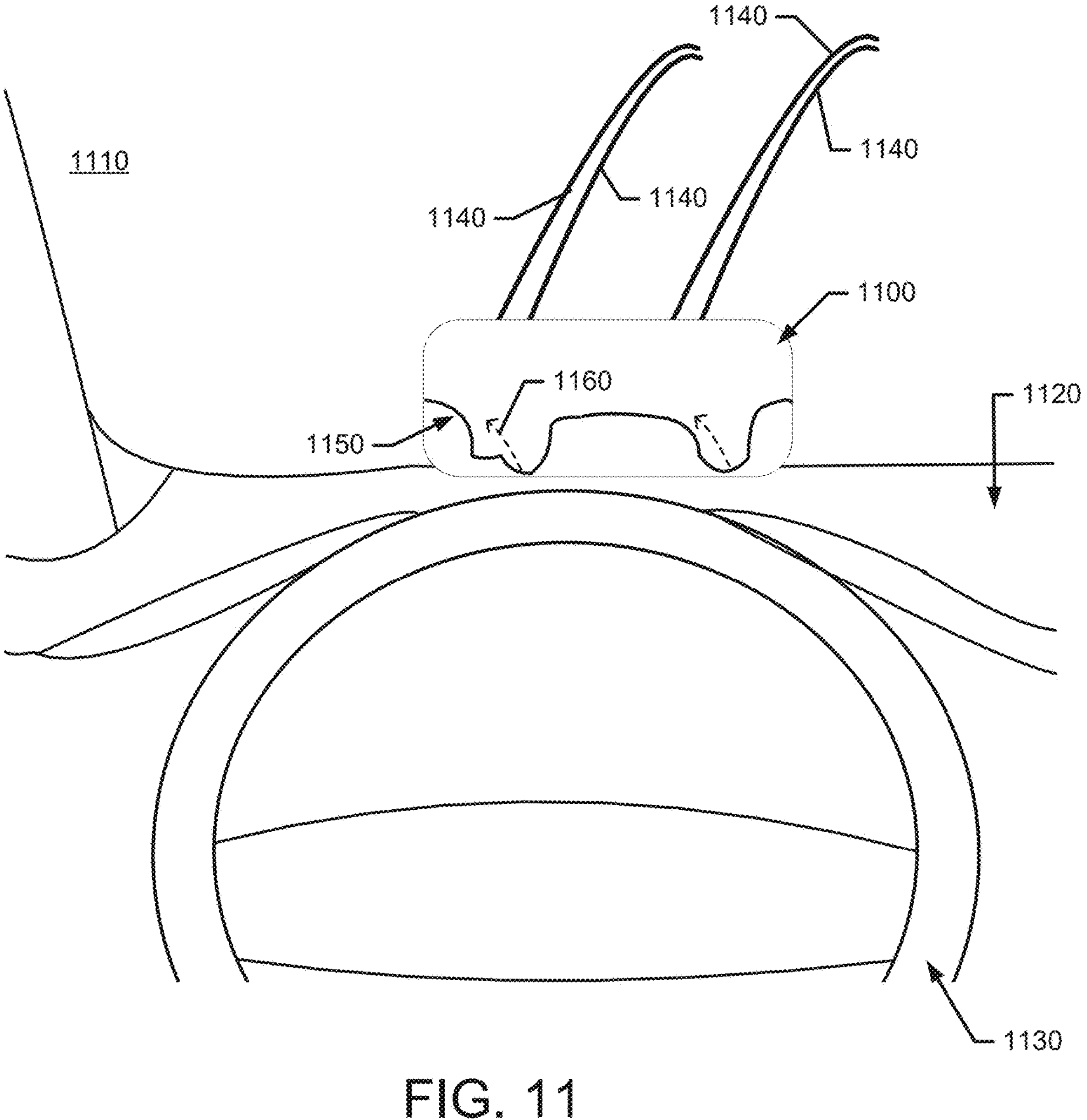
FIG. 11 illustrates a heads up display of a rut profile to assist in traversing the ruts in accordance with an example embodiment.

FIG. 11 illustrates a heads up display 1100 showing directions for the driver with respect to traversing rutted terrain. In this regard, FIG. 11 shows a view from the perspective of the operator 125 of the vehicle 110 of FIG. 1. An actual view of the scene or path/road ahead of the vehicle 110 is visible through the windshield 1110 and over the dash 1120 and steering wheel 1130 is shown. The actual view shows rut edges 1140 as visible in the actual view, but the heads up display 1100 shows a profile view 1150 of the ruts as produced by the rut mapper 274 (or controller 140) along with a maneuvering instruction 1160 indicating that the operator 125 should turn the steering wheel 1130 left to position the vehicle 110 left of the center of the ruts. The heads up display 1100 may also or alternatively indicate speed directions and, in some cases, may not illustrate profile information but instead just instructions or information/suggestions. Notably, the display could alternatively be located at another portion of the dash 1120 such as to the right of the steering wheel 1130 or may be visible through the steering wheel 1130.

Figure 12:
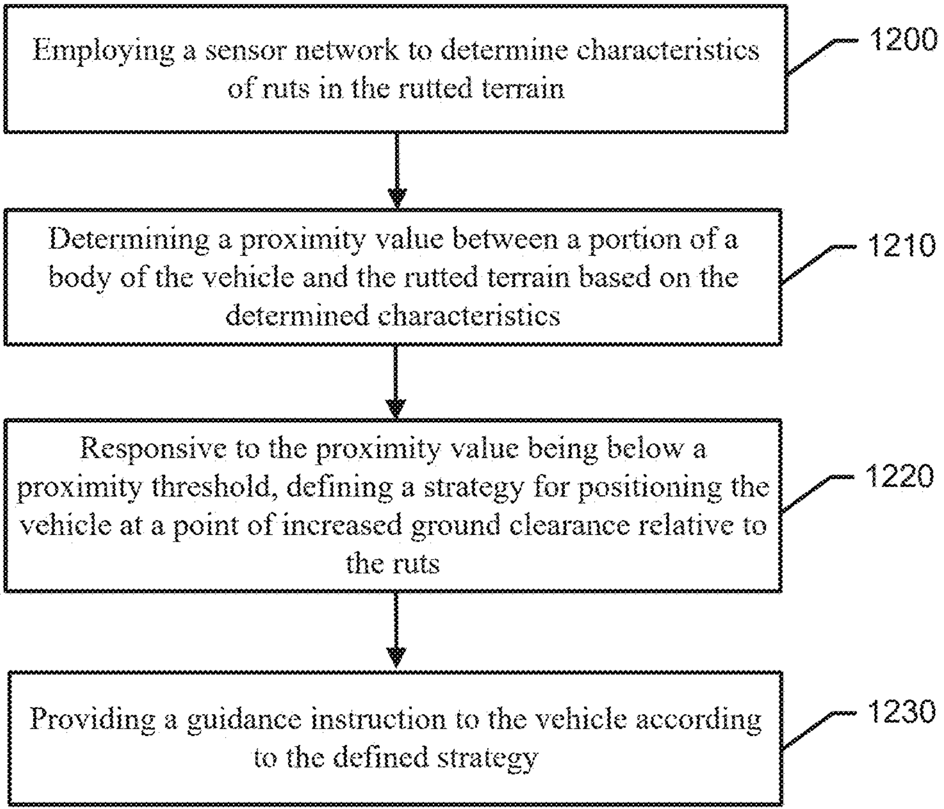
FIG. 12 illustrates a method of traversing rutted terrain in a vehicle in accordance with an example embodiment.

FIG. 12 illustrates a block diagram of one example method of providing automated control of vehicle speed in a driver assist mode (e.g., an off-road driver assist mode or rut traversal mode). The method may include employing a sensor network to determine characteristics of ruts in the rutted terrain at operation 1200, and determining a proximity value between a portion of a chassis (e.g., skid plates, undercarriage, underbody, etc.) of the vehicle and the rutted terrain based on the determined characteristics at operation 1210. The method may further include, responsive to the proximity value being below a proximity threshold, defining a strategy for positioning the vehicle at a point of increased ground clearance relative to the ruts at operation 1220, and providing a guidance instruction to the vehicle according to the defined strategy at operation 1230.

Example embodiments may therefore also include a vehicle control system. The system may include a mode selector for enabling selection of an operating mode of the vehicle among a plurality of selectable operating modes, where at least one of the selectable operating modes includes an off-road driving assistance mode that controls propulsive torque application and/or steering when the off-road driving assistance mode is active. The system may further include a sensor network operably coupled to components of the vehicle to obtain characteristics of ruts, and a controller operably coupled to the sensor network to generate a guidance instruction based on the characteristics of the ruts in association with the off-road driving assistance mode responsive to receiving the characteristics of the ruts, determining a proximity value between a portion of a body of the vehicle and the rutted terrain based on the determined characteristics of the ruts, responsive to the proximity value being below a proximity threshold, defining a strategy for positioning the vehicle at a point of increased ground clearance relative to the ruts, and providing the guidance instruction to the vehicle according to the defined strategy.

The system of some embodiments may include additional features, modifications, augmentations and/or the like to achieve further objectives or enhance performance of the system. The additional features, modifications, augmentations and/or the like may be added in any combination with each other. Below is a list of various additional features, modifications, and augmentations that can each be added individually or in any combination with each other. For example, determining the characteristics of the ruts may include employing a camera, radar or LIDAR to measure a depth and dimensions of the ruts, and determining the proximity value may include comparing a known minimum clearance value for the body portion of the vehicle to the depth and dimensions of the ruts. In an example embodiment, the strategy for positioning the vehicle may include biasing vehicle wheel position relative to the ruts based on depth and dimensional variations of the ruts. Normally, the system may bias the vehicle such that the wheels are effectively centered within the ruts. However, torque vectoring and steering assistance may be employed to steer or bias the vehicle out of the center of the ruts under certain circumstances.

In some cases, determining the characteristics of the ruts may include determining a rut profile defining a variation of depth of the ruts at corresponding lateral locations at a given distance from a front of the vehicle, and the strategy for positioning the vehicle may include determining a best position of the wheels relative to the rut profile. In an example embodiment, providing the guidance instruction may include providing an indication of a degree and direction of steering input to provide via an in cabin display based on the defined strategy. In some cases, providing the guidance instruction may include autonomously controlling steering of the vehicle according to the defined strategy. In an example embodiment, the controller may be further configured for providing a trail rating for multiple different trail options for a driver of the vehicle to evaluate. In some cases, the controller may be further configured for employing machine learning to build a database of rut characteristics and traversal strategies in a defined area. In an example embodiment, the database may include shared information from a plurality of vehicles via vehicle to vehicle (V2V) or vehicle to everything (V2X) communication. In some cases, defining the strategy may include providing an indication to an operator of the vehicle with respect to employment and placement of an auxiliary device relative to the ruts and the vehicle. In an example embodiment, defining the strategy may include performing incremental speed reductions to reduce ground contact frequency and, responsive to the ground contact frequency being below a threshold, performing incremental speed increases. In this context, a step size of incremental speed reductions or increases may be proportional to a rate of change of vehicle motion during traversal of the rutted terrain. In some cases, determining the proximity value may include estimating a change in ride height of the vehicle responsive to traversing the rutted terrain based on vehicle speed and the determined characteristics.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A method of providing vehicle guidance for traversal of rutted terrain, the method comprising:

employing a sensor network to determine characteristics of ruts in the rutted terrain;

determining a proximity value between a portion of a body of the vehicle and the rutted terrain based on the determined characteristics;

responsive to the proximity value being below a proximity threshold, defining a strategy for positioning the vehicle at a point of increased ground clearance relative to the ruts; and providing a guidance instruction to the vehicle according to the defined strategy, wherein determining the characteristics of the ruts comprises determining a rut cross-section defining a variation of depth of the ruts at corresponding lateral locations at a given distance from a front of the vehicle, wherein the strategy for positioning the vehicle comprises determining a best position of the wheels relative to the rut cross-section, and wherein providing the guidance instruction comprises displaying, on an in-cabin display while the vehicle is within the rut, the rut cross-section and an indication of a degree and direction of steering input of an optimal traversal path relative the ruts based on the defined strategy.

2. The method of claim 1, wherein determining the characteristics of the ruts comprises employing a camera, radar or LIDAR to measure a depth and dimensions of the ruts, and wherein determining the proximity value comprises comparing a known minimum clearance value for the body portion of the vehicle to the depth and dimensions of the ruts.

3. The method of claim 1, wherein the strategy for positioning the vehicle comprises biasing vehicle wheel position relative to the ruts based on depth and dimensional variations of the ruts.

4. The method of claim 1, wherein providing the guidance instruction comprises autonomously controlling steering of the vehicle according to the defined strategy.

5. The method of claim 1, further comprising providing a trail rating for multiple different trail options for a driver of the vehicle to evaluate.

6. The method of claim 1, further comprising employing machine learning to build a database of rut characteristics and traversal strategies in a defined area.

7. The method of claim 6, wherein the database comprises shared information from a plurality of vehicles via vehicle to vehicle (V2V) or vehicle to everything (V2X) communication.

8. The method of claim 1, wherein defining the strategy comprises performing incremental speed reductions to reduce ground contact frequency and, responsive to the ground contact frequency being below a threshold, performing incremental speed increases, and wherein a step size of incremental speed reductions or increases is proportional to a rate of change of vehicle motion during traversal of the rutted terrain.

9. The method of claim 1, wherein determining the proximity value comprises estimating a change in ride height of the vehicle responsive to traversing the rutted terrain based on vehicle speed and the determined characteristics.

10. A vehicle control system comprising:

a mode selector for enabling selection of an operating mode of the vehicle among a plurality of selectable operating modes, at least one of the selectable operating modes comprising an off-road driving assistance mode that controls propulsive torque application or steering when the off-road driving assistance mode is active;

a sensor network operably coupled to components of the vehicle to obtain characteristics of ruts; and a controller operably coupled to the sensor network to generate a guidance instruction based on the characteristics of the ruts in association with the off-road driving assistance mode responsive to:

receiving the characteristics of the ruts;

determining a proximity value between a portion of a body of the vehicle and the rutted terrain based on the determined characteristics of the ruts;

responsive to the proximity value being below a proximity threshold, defining a strategy for positioning the vehicle at a point of increased ground clearance relative to the ruts; and providing the guidance instruction to the vehicle according to the defined strategy, wherein determining the characteristics of the ruts comprises determining a rut cross-section defining a variation of depth of the ruts at corresponding lateral locations at a given distance from a front of the vehicle, wherein the strategy for positioning the vehicle comprises determining a best position of the wheels relative to the rut cross-section, and wherein providing the guidance instruction comprises displaying, on an in-cabin display while the vehicle is within the rut, the rut cross-section and an indication of a degree and direction of steering input of an optimal traversal path relative the ruts based on the defined strategy, or autonomously controlling steering of the vehicle on the optimal traversal path according to the defined strategy.

11. The system of claim 10, wherein determining the characteristics of the ruts comprises employing a camera, radar or LIDAR to measure a depth and dimensions of the ruts, and wherein determining the proximity value comprises comparing a known minimum clearance value for the body portion of the vehicle to the depth and dimensions of the ruts.

12. The system of claim 10, wherein the strategy for positioning the vehicle comprises biasing vehicle wheel position relative to the ruts based on depth and dimensional variations of the ruts.

13. The system of claim 10, wherein the controller is further configured for providing a trail rating for multiple different trail options for a driver of the vehicle to evaluate and employing machine learning to build a database of rut characteristics and traversal strategies in a defined area.

14. The system of claim 13, wherein the database comprises shared information from a plurality of vehicles via vehicle to vehicle (V2V) or vehicle to everything (V2X) communication.

15. The system of claim 10, wherein defining the strategy comprises providing an indication to an operator of the vehicle with respect to employment and placement of an auxiliary device relative to the ruts and the vehicle.

16. A method of providing vehicle guidance for traversal of rutted terrain, the method comprising:

employing a sensor network to determine characteristics of ruts in the rutted terrain;

determining a proximity value between a portion of a body of the vehicle and the rutted terrain based on the determined characteristics;

responsive to the proximity value being below a proximity threshold, defining a strategy for positioning the vehicle at a point of increased ground clearance relative to the ruts; and providing a guidance instruction to the vehicle according to the defined strategy, wherein defining the strategy comprises providing an indication to an operator of the vehicle with respect to employment and placement of an external auxiliary device separate from the vehicle relative to the ruts and the vehicle.

* * * * *